Feb. 26, 1957 J. A. ANTONUCCI 2,782,954
COMBINATION SWITCH AND OUTLET BOX
Filed Dec. 27, 1954 2 Sheets-Sheet 1

INVENTOR.
JAMES A. ANTONUCCI
BY
W. B. Harpman
ATTORNEY

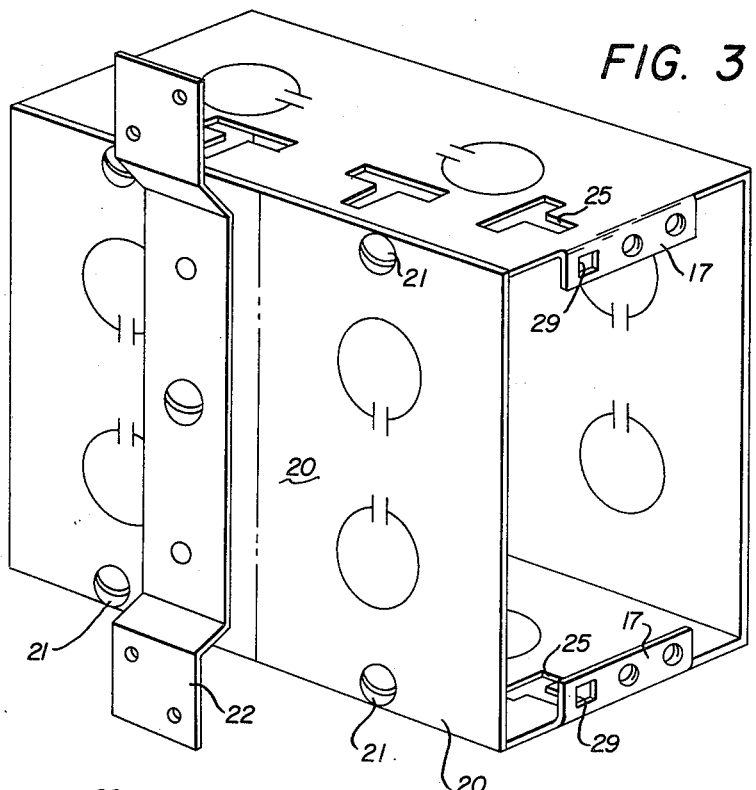
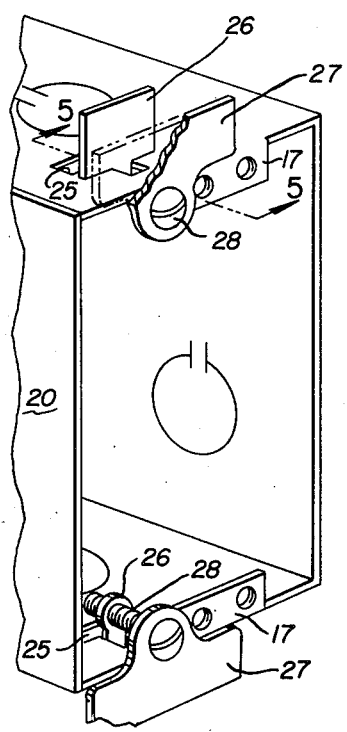
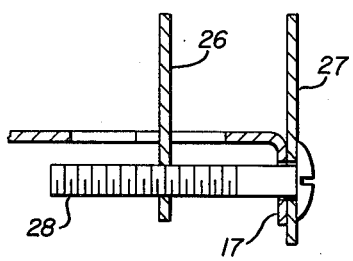

United States Patent Office 2,782,954
Patented Feb. 26, 1957

2,782,954

COMBINATION SWITCH AND OUTLET BOX

James A. Antonucci, Youngstown, Ohio

Application December 27, 1954, Serial No. 477,718

4 Claims. (Cl. 220—3.92)

This invention relates to a switch and outlet box arranged to be usable by alternate positioning of an end portion as either a switch box or an outlet box.

The principal object of the invention is the provision of a combination switch and outlet box wherein a single structure is usable in a number of locations for the mounting of electrical switches in outlets, etc.

A further object of the invention is the provision of an outlet box having open front and side portions and a cover portion capable of covering either the front or the side portion, as desired.

A still further object of the invention is the provision of a combination switch and outlet box having clamping means for securing said box in an opening in a wall surface.

A still further object of the invention is the provision of a simple and inexpensive rectangular outlet box having two different sized sides thereof open and a panel severable for selective application to either of the two open sides, as desired.

A still further object of the invention is the provision of a combination switch and outlet box which may be utilized for mounting a wall switch, or a convenient outlet, and wherein a relatively high and narrow outlet box is indicated as well as usable where a square relatively large sized outlet box is indicated.

The combination switch and outlet box disclosed herein comprises an improvement in the art in that a single box with a single cover panel is arranged so that the box can be used as a single switch mounting box, a multiple switch mounting box or a relatively large outlet box by merely affixing the single cover panel to an appropriate open side of the box.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 3 is a perspective view showing the outlet box arranged for use as a single switch box.

Figure 4 is a perspective view with parts broken away and parts in cross section illustrating mounting means on said box.

Figure 5 is an enlarged cross section taken on line 5—5 of Figure 4.

Figure 1:
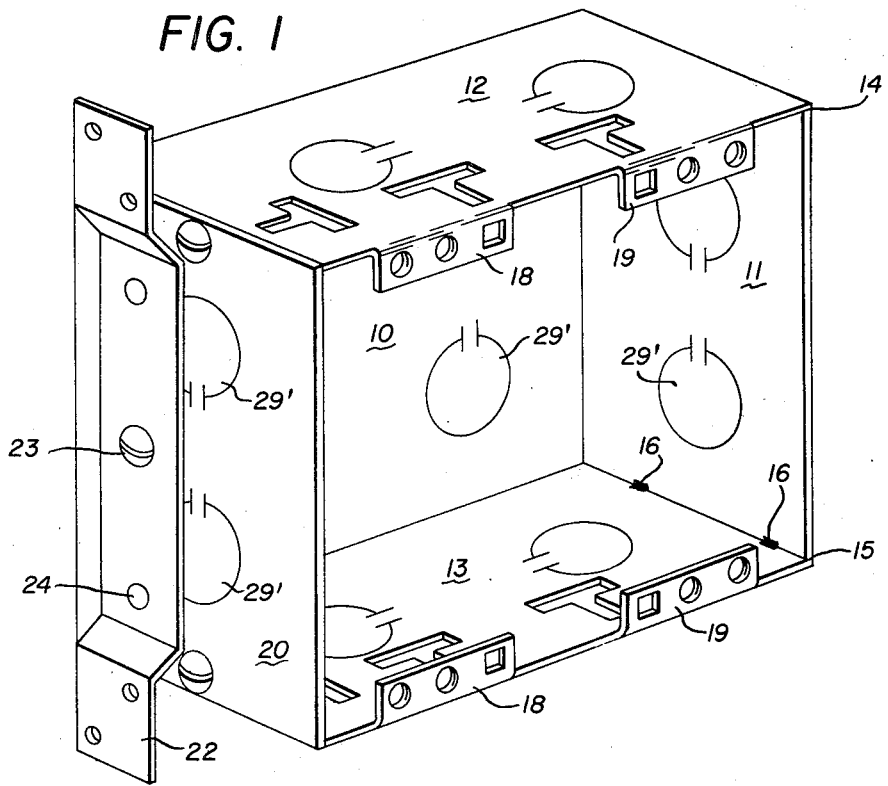
Figure 1 is a perspective view of the combination switch and outlet box showing the same arranged for use as a multiple switch box or a large outlet box.
Figure 2:
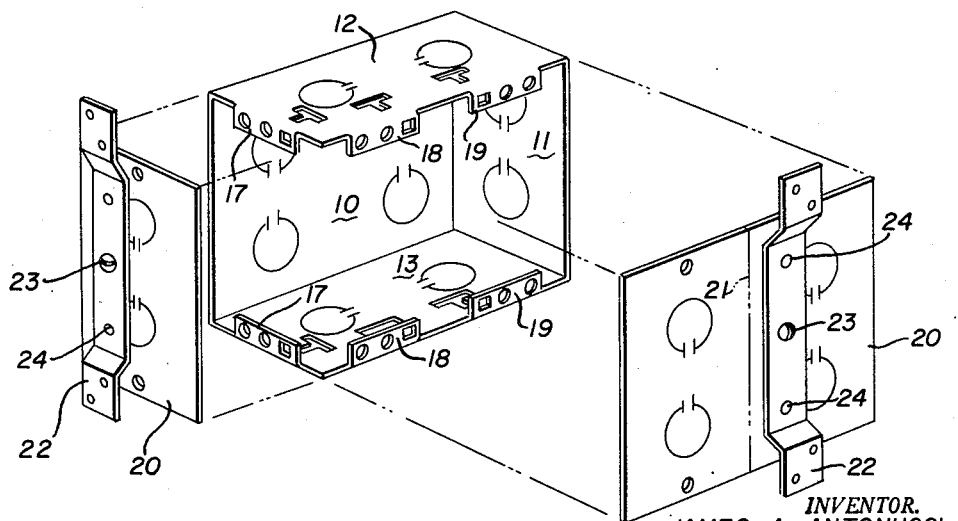
Figure 2 is a perspective view showing the outlet box with cover panels in spaced relation to their installed locations on the outlet box.

By referring to the drawings and Figures 1, 2 and 3 in particular it will be seen that the outlet box comprises an enclosure formed of sheet metal having a square back 10, an integrally formed end 11 and integrally formed top and bottom portions 12 and 13. The back portion 10 and the top and bottom portions 12 and 13 are formed from a rectangular blank with an offset portion of the blank forming the end 11. The seams joining the end 11 and the top and bottom portions 12 and 13 are indicated by the numerals 14 and 15 and are welded as at 16.

The opposite end with respect to the end 11 is open, as shown in Figure 2 of the drawings, and the top and bottom portions 12 and 13 are provided with an oppositely disposed pair of inturned apertured lugs 17 in the area of the opposite open end. A plurality of inturned oppositely disposed apertured lugs 18 and 19 are formed on the top and bottom portions 12 and 13 in the area of the open front of the box.

A cover panel 20, square in shape and having a centrally disposed frangible line 21 is provided, as seen in Figure 2 of the drawings, and usable in its integral square shape as a cover panel for the open front of the box, as shown in Figure 3 of the drawings.

By referring to Figure 3 of the drawings it will be seen that the cover panel has been secured to the open front of the box by a plurality of screws 21 engaged in appropriate threaded openings in the lugs 18 and 19 so that the box presents an open end and is, therefore, usable as a mounting for a single switch or convenience outlet. The switch or convenience outlet mechanism (not shown) is mountable in the box by securing the same by screws to the appropriate openings in the inturned lugs 17 heretofore referred to.

It will be observed that the box in Figure 3 of the drawings has been turned upside down with respect to the box in Figures 1 and 2 of the drawings so that it may be affixed by a mounting bracket 22 to a structure member such as a 2 x 4 in a wall and against which the box is mounted. The mounting bracket 22 is detachably secured offcenter to the cover panel 20 by means of a screw 23 and one or more pairs of matching dimple-like depressions 24.

It will thus be seen that the combination switch and outlet box as disclosed in Figure 3 of the drawings is suitable for mounting a single switch or a single convenience outlet in a wall adjacent a framing member thereof by means of the bracket 22. It will also be seen that the same box with half the cover panel 20 removed and the same affixed to an end thereof, as illustrated in Figure 1 of the drawings, is usable in a wall for mounting a pair of switches or a pair of convenience outlets and attachable to a supporting framing member by the bracket 22.

It will also be seen that by removing the mounting bracket 22, the resulting outlet box may be secured to a ceiling strip or other suitable support (not shown) and the outlet box mounted in the ceiling providing the square outlet box which will mount a conventional reducing plaster flange, if desired.

A further modification of the box is possible in that the cover panel 20 may be applied to the open front, an extra portion of another cover panel may be applied to the end, as shown in exploded relation in Figure 2 of the drawings, and a completely closed box realized which can obviously serves as a junction box.

A still further modification will be seen by those skilled in the art in that both ends of the box, for example, as shown in Figure 2 of the drawings, may be left open along with the front so that a number of such modified boxes may be joined in end-to-end relation to form an outlet box of extreme length and capable of receiving a plurality of switches or convenience outlets.

Alternately, a pair of boxes, illustrated in Figure 2 of the drawings, may be mounted in end-to-end relation to form an outlet box capable of receiving four single switches in side-by-side relation.

By referring now to Figures 4 and 5 of the drawings a novel means of mounting the combination switch and outlet box in a wallboard or plastered wall surface may be seen, and by referring thereto it will be observed that the outlet box is provided with a plurality of T-shaped openings 25 and that paddle-shaped clamping members 26 are positioned in the T-shaped openings 25 and thus are movable toward and away from the inturned lugs 17.

Secondary clamping pieces 27—27 are positioned over bolts 28 which are passed through appropriate unthreaded openings 29 in the lugs 17 and threadably engaged in openings in the paddle-shaped clamping members 26. Rotation of the bolts 28 will thus move the paddle-shaped clamping members 26 toward the secondary clamping members 27.

It will occur to those skilled in the art that the combination switch and outlet box may thus be positioned in an appropriately shaped opening in a wallboard or a plastered wall, the paddle-shaped members inserted and pushed outwardly through the T-shaped openings 25, the secondary clamping members 27 and bolts 28 positioned through the apertured lugs 17 and engaged in threaded openings in the paddle-shaped members 26 and the secondary clamping members 27 will be respectively positioned on the opposite sides of the intervening wall and thereby capable of securing the combination switch and outlet box thereto by an appropriate clamping action.

It will also be seen that the combination switch and outlet is provided with a plurality of conventional knock-out areas 29' so that the same may be removed in the desired areas to permit installation of wiring as is customary.

It will thus be seen that the combination switch and outlet box disclosed herein meets the several objects of the invention.

Having thus described my invention, what I claim is:

1. A combination switch and outlet box comprising a box having an integral back, top, bottom and one end, with an open front and an open end, a cover for said box, means on said top and bottom portions adjacent said open front and end for removably attaching said cover, said cover being of a size registering with said open front and having a centrally disposed frangible line by means of which half of said cover may be separated from the remainder and used to form a cover for said open end of said box.

2. A combination switch and outlet box comprising a box having a unitary back, top, bottom and end portion and defining an open end area and an open front area, inturned apertured lugs on said top and bottom portions extending in oppositely disposed pairs into said open end and open front areas, and a cover panel of a size equal to said open front area, and fasteners for securing said cover panel to said apertured lugs, said cover panel having a centrally disposed frangible line permitting half of the cover panel to be separated therefrom and applied to said open end area and secured to said depending lugs in said open end area.

3. The combination switch and outlet box set forth in claim 1 and wherein a bracket having offset end portions is removably affixed to said cover.

4. The combination switch and outlet box set forth in claim 2 and wherein a bracket having offset end portions is removably attached to said cover panel on one side of said frangible line.

References Cited in the file of this patent

UNITED STATES PATENTS

| | | |
|---|---|---|
| 1,200,958 | Loftus | Oct. 10, 1916 |
| 2,044,650 | Thompson | June 16, 1936 |
| 2,130,839 | Conners | Sept. 20, 1938 |
| 2,299,696 | Gregersen | Oct. 20, 1942 |
| 2,406,587 | Cooper | Aug. 27, 1946 |
| 2,556,061 | Buckels | June 5, 1951 |